United States Patent [19]

Beckert et al.

[11] 4,341,651

[45] Jul. 27, 1982

[54] COMPOSITIONS AND METHODS FOR GENERATION OF GASES CONTAINING HYDROGEN OR HYDROGEN ISOTOPES

[75] Inventors: Werner F. Beckert, Las Vegas, Nev.; William H. Barber, Brandywine, Md.; Richard E. Bowen, Woodbridge; Ottmar H. Dengel, Front Royal, both of Va.

[73] Assignee: The United States of America as represented by the Secretary of the Navy, Washington, D.C.

[21] Appl. No.: 181,526

[22] Filed: Aug. 26, 1980

[51] Int. Cl.$^3$ .............................................. C01B 1/07
[52] U.S. Cl. ....................... 252/188.25; 252/188.3 R; 149/87; 423/648 R
[58] Field of Search ............... 252/188.3 R, 188, 350; 423/646, 647, 648; 149/87; 923/248

[56] References Cited

U.S. PATENT DOCUMENTS

| | | |
|---|---|---|
| 3,734,863 | 5/1973 | Beckert et al. ....................... 252/188 |
| 3,862,052 | 1/1975 | Beckert et al. ............... 252/188.3 R |
| 3,977,990 | 8/1976 | Beckert et al. ............... 252/188.3 R |
| 4,021,362 | 5/1977 | Channell et al. ............. 252/188.3 R |
| 4,022,705 | 5/1977 | Beckert et al. ............... 252/188.3 R |
| 4,231,891 | 11/1980 | Beckert et al. ....................... 252/188 |

*Primary Examiner*—Joseph L. Schofer
*Assistant Examiner*—J. L. Barr

[57] ABSTRACT

A composition which upon heating generates hydrogen or hydrogen isotopes comprises an intimate mixture of a hydride component selected from the group consisting of calcium hydride, magnesium hydride, sodium hydride, lithium hydride and mixtures thereof, and a salt component selected from the group consisting of ammonium salts, hydrazinium salts and mixtures thereof, said hydride component being present in at least a stoichiometric amount.

19 Claims, No Drawings

COMPOSITIONS AND METHODS FOR GENERATION OF GASES CONTAINING HYDROGEN OR HYDROGEN ISOTOPES

BACKGROUND OF INVENTION

This invention relates generally to gas generation and more particularly to the generation of hydrogen gas and its isotopes.

Currently convenient, storable, inexpensive sources of predetermined quantities of hydrogen for inflation of balloons, fluidic devices, fuel cells, chemical-laser systems and mechanical power sources are needed. It is necessary that the hydrogen generation is fast (>10 l/sec), the hydrogen so produced has as low a temperature as possible and the generating means is as light as possible. Pressurized hydrogen gas cylinders cannot meet the severe weight-volume restrictions of many applications. Hydrogen-gas generation by conventional chemical reactions, for example, the reaction of a metal or metal hydride with an acid, base, water, or alcohol is not adequate for many applications for the above reasons. In addition, most of these reactions are highly exothermic, and the reaction mixtures must be cooled to prevent boiling off of the liquid phase and formation of a hydrogen/(alcohol or water) vapor mixture).

The best results to date have been obtained from the reactions disclosed in U.S. Pat. Nos. 3,734,863; 3,862,052; 3,931,395; 3,977,990; and 4,022,705 to Beckert et al. More specifically, U.S. Pat. Nos. 3,734,863; 3,862,052; and 3,931,395 disclose reacting ammonium or hydrazinium salts with suitable complex metal hydrides as expressed by the following general formulae and general equations:

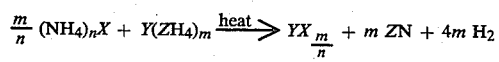

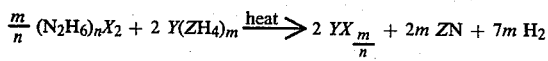

where X is an acid group, such as halides (Cl$^-$, Br$^-$, F$^-$) or sulfate (SO$_4^{2-}$); n is the valency of the acid group; Y is a mono- or divalent metal capable of forming complex hydrides, such as alkali and alkaline earth metals, especially lithium, sodium, potassium, magnesium, barium, calcium or strontium; m is the valency of said metal, and Z is a trivalent metal capable of forming complex hydrides, such as, boron or aluminum. Similarly, U.S. Pat. No. 3,977,990 to Beckert et al. teaches that hydrogen-gas-evolution rates and gas temperatures of certain hydrogen-gas-generating compositions are modified by adding compounds, e.g., LiAlH$_4$, which thermally decompose in the reaction zone producing hydrogen while lowering the reaction temperature; and certain metal acetylacetonates, metal oxides, and the like which, when added in relatively small amounts accelerate or decelerate the hydrogen gas evolution rate.

While these methods and compositions are satisfactory in providing hydrogen at a fast rate from solid, storable compositions, complex metal hydrides are commercially available only to a limited extent and they are relatively expensive. Furthermore, many of these compositions produce hydrogen at an unacceptably high temperature. One attempt in overcoming the expense and limited availability of many of the above compositions is disclosed and described in U.S. patent application Ser. No. 916,423 now U.S. Pat. No. 4,231,891 of Beckert et al. These compositions comprise a hydrazinium or an ammonium salt and certain metals. While providing cheaper hydrogen at a purity sufficient for laser or fuel cell applications, the compositions produce hydrogen at temperatures that are unacceptably high for many applications.

SUMMARY OF THE INVENTION

It is, therefore, an object of the present invention to provide a relatively inexpensive source of gaseous hydrogen, hydrogen isotopes, or mixtures thereof.

Another object of this invention is to provide compositions for generating hydrogen, hydrogen isotopes or mixtures thereof which are stable enough for prolonged storage.

And another object of this invention is to provide compositions for generating hydrogen, hydrogen isotopes or mixtures thereof at relatively low temperatures.

A further object of this invention is to provide compositions for generating gaseous hydrogen, which are economical and relatively safe.

A still further object of this invention is to provide compositions for generating gaseous hydrogen, hydrogen isotopes, or mixtures thereof sufficiently pure for laser or fuel cell applications.

These and other objects are achieved by the solid state reaction of a hydride selected from the class consisting of calcium hydride, magnesium hydride, sodium hydride, lithium hydride and mixtures thereof with a hydrazinium salt or an ammonium salt.

DETAILED DESCRIPTION OF THE INVENTION

The solid state reactions producing hydrogen, hydrogen isotopes or mixtures thereof, according to the present invention, can be expressed by the following general formulae and equations:

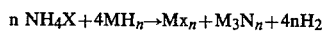

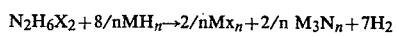

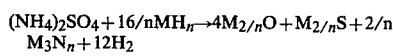

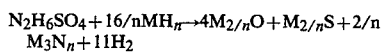

wherein H represents hydrogen or its isotopes, X represents a monovalent inorganic acid anion, M represents a metal cation, and n is valence of the metal cation. The preferred metal hydrides (MH$_n$) are lithium hydride, magnesium hydride, and calcium hydride because of their stability and the purity of the produced hydrogen gas. For applications not requiring high-purity hydrogen, sodium hydride can be substituted for part of the hydrides required. The preferred inorganic anions are chloride and bromide because of their stability and the purity of the produced hydrogen. Ammonium or hydrazinium fluorides are only moderately stable and iodides, while being stable, produce mesh less hydrogen per gram of reactants. Acid anions other than sulfate can be used, e.g., nitrate, phosphate, or perchlorate; however, the purity of the generated hydrogen gas is generally not as high as with halides. For applications requiring large volumes of gases, salts containing these anions can be used. The preferred anion of this group is the sulfate because of its stability and for the relatively small amount of nonhydrogen gases produced from a reaction between a salt having this anion and one of the above hydrides.

The reactants are intimately mixed in about stoichiometric amounts according to the preceding general equations. However, it may be desirable to add an excess of the hydride reactants because of the cooler product gases so produced. For example, excess $MgH_2$ added to the stoichiometric mixture $2\ NH_4Cl/4\ MgH_2$ decomposes endothermically to produce Mg and hydrogen gas, thus reducing both reaction temperature and gas temperature. Generally, an excess up to 50% of the stoichiometric amount can be used advantageously. A deficiency of the hydride reactants gives no advantage and causes a loss of hydrogen generation. The preferred amount of the hydride reactants is from about stoichiometric amount to a 25% excess over the stoichiometric amount.

Thermodynamic calculations show that some combinations of simple metal hydrides with certain ammonium or hydrazinium salts do not react exothermically. An example would be the reaction between $CaH_2$ and $NH_4Cl$. However, such combinations can be very useful when an external heat source is used to regulate the reaction rate. This provides systems with on-off capabilities which is highly desirable for certain applications such as hydrogen or deuterium generation for use in chemical lasers. Balanced combinations of exothermic mixtures of reactants and endothermic mixtures of reactants are especially useful when designed to require only a small external heat source to keep gas generation going.

It is possible to include in the present compositions a powdered metal selected from the class consisting of magnesium, aluminum, vanadium, zirconium, titanium, silicon and mixtures thereof or a mixed metal hydride selected from the class consisting of lithium borohydride ($LiBH_4$), sodium borohydride ($NaBH_4$), lithium aluminum hydride ($LiAlH_4$), and sodium aluminum hydride ($NaAlH_4$) and mixtures thereof. Since no compatability problems exist, any amount of these other ingredients may be added, but the advantages of the present hydrides would be diluted. However, the inclusion of these other ingredients does have the significant advantages of permitting the precise formulation of the reaction rate and temperature and output volume and purity. An inclusion of about 5 to 10%, based on total weight of composition, of a metal or mixed metal hydride, would have the advantage in lowering the initiation temperature while not significantly diluting the benefit of the present hydrides.

It is also desirable to optionally use binders and/or plasticizers to improve handling and/or mechanical stability. Any binder compatible with the rest of the composition may be used, such as polystyrene, styrene-isobutylene copolymers, or others, and can be added in an amount up to about 15 percent of the total weight of said composition. Similarly, any plasticizer, such as CONCO oil, an aromatic paraffinic oil, can be used so long as it is compatible with the rest of the composition. The preferred amount of plasticizer is up to about 30 weight percent of the binder.

Any solvent which dissolves the binder and is compatible with the rest of the composition can be used to facilitate processing of the composition. Special precautions might be necessary in the selection of binders, plasticizers, additives and solvents when high-purity gases are desired. For example, when pure deuterim gas is desired it is beneficial to either use deuterated binders, plasticizers, additives and solvents or to use binders, plasticizers, additives, and solvents which do not contain any hydrogen exchangeable under the conditions of use, for instance, polyfluorinated compounds. Reaction rate modifiers, such as $Fe_2O_3$ of U.S. Pat. No. 3,977,990 by Beckert et al. can also be included in the composition.

Small particle size ($\leq 100$ microns) of the ingredients is desirable since large particle sizes generally decrease the gas-evolution rate and yield. Although, in general, a small particle size of the gas-generator ingredients is desirable to obtain a fast and nearly complete reaction, large particle sizes would be selected for a special purpose, e.g., to slow down the reaction or to obtain a specific grain structure.

The compositions of the present invention can be simply prepared by intimately mixing the ingredients. These compositions can be utilized simply as powders or they can be pressed into pellets or slugs to facilitate handling and improve storage stability and safety characteristics, as well as, to achieve a more uniform rate of gas evolution after initiation. Coating one or all of the starting components with a small amount (usually about 0.5–5 weight percent) of a suitable polymer, e.g. polystyrene, polyethylene, polybutadiene, polycarbonate, or polyhydroxyvinyl resin prior to mixing has been found to further improve the handling and storage characteristics. Such coating is especially beneficial for components which are sensitive to moisture. Furthermore, micro-encapsulation techniques can be used to increase the temperature stability of certain hydride-ammonium halide combinations.

If a binder has been included in the composition, the composition can be conveniently prepared as a slurry of the components in an inert solvent, e.g., toluene. After evaporation of the solvent in vacuo, the material is ground in a blender and then pressed into form. Depending on the nature of the material and the intended application other mixing and shaping techniques can be used, such as, casting, extrusion or inert diluent mixing.

The solid-state reaction which produces hydrogen or its isotopes from the composition of the present invention is initiated by locally heating the composition to at least the melting point of one of the reactants. For the preferred reactants of this invention the initiation temperature is generally from 180° to 280° C. The local heating can be accomplished by any suitable heat source, for instance, a resistance heater fabricated from Nichrome wire, a pyrofuse, an electrical squib, or a mechanical squib. In addition, ordinary percussion caps and igniter pills, e.g., barium chromate-zirconium metal mixture ($BaCrO_4/Zr$) may be utilized.

If the hydrogen or hydrogen isotopes being produced from the compositions of the present invention need further cooling, the gases can be cooled by heat exchangers and/or heat-sink arrangements containing materials having a high specific heat such as copper, nickel, cobalt, or materials which exhibit an endothermic phase change between the ambient and the desired temperature and/or a low melting point with a high heat of fusion and heat capacities, e.g., $Na_2HPO_4.2H_2O$.

The hydrogen generating compositions may be encapsulated or otherwise packaged in such a manner that they may be adapted as a convenient source of predetermined quantities of hydrogen or its isotopes) for the inflation of lighter-than-air balloons or other inflatables, use in fluidic devices, mechanical power sources, fuel cells and laser and nuclear applications, as well as other military and commercial uses.

The general nature of the invention having been set forth, the following examples are presented as specific illustration thereof. It is understood that the following examples are given by way of illustration and are not meant to limit the disclosure and claims to follow in any manner.

EXAMPLE 1

In a drybox, anhydrous ammonium chloride (53.5 grams) and magnesium hydride (52.6 grams) were thoroughly mixed together in a toluene solution of styrene-butadiene copolymer and CONCO oil. The solvent was evaporated in vacuo at ambient temperature followed by a pulverization of the dried mass and a pressing of the mass into a pellet. The pellet was placed in a light-weight aluminum gas generator described in U.S. Pat. No. 3,898,048 to Barber et al. Reaction products and reaction temperature are shown in Table I.

EXAMPLES 2,3,4

The above preparation and test were repeated for $MgCl_2/(NH_4)_2SO_4$, $CaH_2/(NH_4)_2SO_4$, $MgH_2/N_2H_4(2HCl)$. The results are also summarized in Table I.

EXAMPLE 5

A mixture is prepared as in example 1, except that a 20% excess of magnesium hydride is used. The gas evolution rate is slower than in example 1 but the generated gas contains a smaller percentage of nitrogen and ammonia.

TABLE 1

| Example | weight % | solid reaction products | Gaseous reaction products | Hydrogen yield liter/gram | Reaction Temperature °K. |
|---|---|---|---|---|---|
| $MgH_2$ | 49.6 | $MgCl_2$ | $H_2$ | 0.84 | 686 |
| $NH_4Cl$ | 50.4 | $Mg_3N_2$ | | | |
| $MgH_2$ | 61.4 | $Mg_3N_2$ | $H_2$ | 0.78 | 1283 |
| $(NH_4)_2SO_4$ | 38.6 | MgO MgS | | | |
| $CaH_2$ | 56.0 | CaO | $H_2$ | 0.57 | 1046 |
| $(NH_4)_2SO_4$ | 44.0 | CaS $Ca_3N_2$ | | | |
| $MgH_2$ | 50.1 | $MgCl_2$ | $H_2$ | 0.75 | — |
| $N_2H_4(2HCl)$ | 49.9 | $Mg_3N_2$ | | | |

The test results show that a sufficiently high volume of hydrogen is obtained from the compositions of the present invention. Further, the purity and the rate of hydrogen evolution establish that these compositions are suitable for high-purity applications such as in lasers and fuel cells. With the many disclosed variations it is possible to formulate gas generating compositions which fulfill a wide variety of requirements. Furthermore the compounds employed in the compositions of this invention are either commercially available or can be easily prepared by conventional synthetic techniques. Their availability, ease and relatively low cost of preparation are major advantages of the compositions of the present invention. The present compositions represent an important innovation to the developments disclosed in the previously cited patents by Beckert et al. which are incorporated herein by reference.

What is claimed and desired to be secured by Letters Patent of the United States is:

1. A composition for generating hydrogen, hydrogen isotopes, and mixtures thereof consisting of a metal hydride selected from the class consisting of lithium hydride, magnesium hydride, calcium hydride, sodium hydride, and mixtures thereof; and an ammonium or hydrazinium salt of an inorganic acid anion selected from the class consisting of chloride, bromide, iodide, nitrate, phosphate, perchlorate, and mixtures thereof in an effective amount.

2. The gas generating composition of claim 1 wherein said metal hydride is present from about a stoichiometric amount to about 50 percent in excess of the stoichiometric amount.

3. The composition of claim 2 wherein said inorganic acid anion is selected from the class consisting of chloride, bromide and sulfate.

4. The composition of claim 3 wherein said inorganic acid anion is selected from the class consisting of chloride and bromide.

5. The composition of claim 2 wherein said metal hydride is selected from the class consisting of magnesium hydride and calcium hydride.

6. The composition of claim 4 wherein said metal hydride is selected from the class consisting of magnesium hydride and calcium hydride.

7. The composition of claim 4 wherein said metal hydride is present in an amount from the stoichiometric amount to 25 weight percent over the stoichiometric amount.

8. The composition of claim 5 wherein said metal hydride is present from about the stoichiometric amount of about 25 weight percent over the stoichiometric amount.

9. A composition for generating hydrogen, hydrogen isotopes, and mixtures thereof comprising:
a metal hydride selected from the class consisting of lithium hydride, magnesium hydride, calcium hydride, sodium hydride, and mixtures therefor;
an ammonium or hydrazinium salt of an inorganic acid anion selected from the class consisting of chloride, bromide, iodide, nitrate, phosphate, perchlorate, and mixtures thereof in an amount from about the stoichiometric amount to an amount in about 50 percent in excess of stoichiometry; and
a mixed metal hydride selected from the class consisting of lithium borohydride, sodium borohydride, lithium aluminum hydride and sodium aluminum hydride in an amount from about 5 to about 10 weight percent.

10. The composition of claim 9 wherein said metal hydride is present from the stoichiometric amount to 25 weight percent in excess of the stoichiometric amount.

11. The composition of claim 9 wherein at least one component of the mixture is coated with a polymer selected from the group consisting of polystyrene, polyethylene, polybutadiene, polycarbonate and polyhydroxyvinyl.

12. The composition of claim 9 further comprising a binder up to about 15% by weight of said compositions.

13. The composition of claim 12 additionally comprising a suitable plasticizer up to about 30% by weight of said binder.

14. The composition of claim 12 wherein said binder comprises an isobutyl-styrene copolymer.

15. The composition of claim 9 which further comprises a metal powder selected from the class consisting of magnesium, aluminum, vanadium, zirconium, silicon and titanium in an amount from about 5 to about 10 percent of total composition weight.

16. The composition of claim 14 wherein said inorganic acid anion is selected from the class consisting of chloride, bromide, and sulfate.

17. The composition of claim 15 wherein said inorganic acid anion is selected from the class consisting of chloride, bromide and sulfate.

18. The composition of claim 16 or 17 wherein said metal hydride is selected from magnesium hydride and calcium hydride.

19. The composition of claims 16 or 17 wherein said metal hydride is calcium hydride.

* * * * *